United States Patent [19]
Laprade et al.

[11] 3,977,375
[45] Aug. 31, 1976

[54] ARRANGEMENT FOR CORRECTING THE PROPORTIONS OF AIR AND FUEL SUPPLIED TO AN INTERNAL COMBUSTION ENGINE

[76] Inventors: Bernard R. Laprade; Xavier J. P. Laprade, both of 64-Arudy; Pièrre J. Gelé, Route de Lourdes, 65-Odas Tarbes, all of France

[22] Filed: June 25, 1974

[21] Appl. No.: 482,881

[30] Foreign Application Priority Data
June 26, 1973 France .............................. 73.23453
May 24, 1974 France .............................. 74.18029

[52] U.S. Cl. .............................. 123/119 D; 60/276; 123/124 R; 123/124 B
[51] Int. Cl.² ........................................ F02M 23/00
[58] Field of Search ..... 123/119 D, 119 DB, 124 R, 123/124 B, 119 F; 60/276, 287, 289, 290, 304, 307; 261/63

[56] References Cited
UNITED STATES PATENTS

| | | |
|---|---|---|
| 1,347,192 | 7/1920 | Tygard et al. .................... 123/119 D |
| 3,374,991 | 3/1968 | Walker ............................ 123/124 B |
| 3,664,316 | 5/1972 | Garcea ........................... 123/119 D |
| 3,675,632 | 7/1972 | Nakajima ........................ 123/119 D |
| 3,738,341 | 6/1973 | Loos ..................................... 60/276 |
| 3,759,232 | 9/1973 | Wahl et al. ..................... 123/119 D |
| 3,820,326 | 6/1974 | Inoue et al. ..................... 123/124 B |
| 3,866,588 | 2/1975 | Nakada et al. ................. 123/119 D |

*Primary Examiner*—Wendell E. Burns
*Assistant Examiner*—David D. Reynolds
*Attorney, Agent, or Firm*—Finnegan, Henderson, Farabow & Garrett

[57] ABSTRACT

At least one auxiliary air inlet is provided. The inlet is controlled by at least one valve communicating with the inlet pipe of the engine downstream of a device determining the proportion of air and fuel supplied to the engine, such as a carburettor. The valve is controlled by the vacuum from the proportioning device via a capsule including a diaphragm biased by a spring. The vacuum is modulated by an electromagnetic valve controlled by a sensor positioned in the exhaust pipe. The sensor delivers to the electromagnetic valve an electric current variable as a function of the composition of the burnt gases.

21 Claims, 8 Drawing Figures

ARRANGEMENT FOR CORRECTING THE PROPORTIONS OF AIR AND FUEL SUPPLIED TO AN INTERNAL COMBUSTION ENGINE

BACKGROUND OF THE INVENTION

French Patent No. 72 27792, filed the Aug. 2, 1972 in the name of the applicants, describes a means for correcting the proportions of air and petrol in internal combustion engines, the correction means being adaptable to existing engines without its being necessary to replace or modify the components thereof.

The correction means, which considerably reduces the pollution resulting from defects in the air-petrol mixture ratios in the engine, comprises essentially an auxiliary air inlet downstream of an air-petrol proportioning device, controlled by a valve which is itself controlled by electric pulses synchronous with the engine, in response to data supplied by a sensor analysing the burnt gases.

SUMMARY OF THE INVENTION

The present invention has for its object similar means, that is, a means adaptable to existing engines without modification of their components, and operating by injecting measured quantities of air into the inlet or intake pipe, downstream of the proportioning device, but of a more simple design, which is less expensive and more efficient.

The means according to the invention comprises at least one auxiliary air inlet connected to the engine inlet pipe downstream of the member determining the proportions of the air-petrol mixture, at least one valve controlling the auxiliary air inlet or inlets, this valve being controlled by the vacuum or vacuum pressure obtained in the body or venturi of the proportioning device, by means of a capsule or chamber means of which the diaphragm supported by a resilient return means is subject to the vacuum, by means of a pipe opening into the body, the vacuum being itself modulated by an electromagnetic valve, the opening of which is controlled by a sensor disposed in the exhaust pipe and capable of delivering an electric current which is variable as a function of the composition of the burnt gases.

The invention also comprises the following devices:

1. The modulation of the vacuum obtaining in the body of the carburettor and acting on the capsule controlling the secondary air admission valve is effected by a buffer chamber or reservoir placed on the pipe connecting the capsule to the body of the carburettor, this buffer reservoir being equipped with a leakage duct open to the atmosphere and on which is mounted the electromagnetic valve controlled by the sensor.

In this modification, the supply of secondary air is shut off when the electromagnetic valve is opened and the vacuum in the buffer reservoir has again fallen to a zero value.

The effect of the data originating from the sensor is thus made much more progressive or flexible, because of the action of the buffer reservoir.

2. This opening to the atmosphere, and also the auxiliary air intake, will preferably be effected by way of a filter, for example, in the admission pipe upstream of the carburettor and downstream of the carburettor.

3. Preferably, calibrated orifices or equivalent nozzles are placed between the buffer chamber or reservoir and the carburettor body, on the one hand, and/or on the leakage duct, on the other hand, in order to establish pressure drops which improve and regulate the progressive nature of the action of the electromagnetic valve.

4. As a modified form, the electromagnetic valve provided under 1 is formed by a thermostatic valve placed on the leakage duct and of which the heating is produced by the voltage originating from the sensor, this ensuring a direct progressive modulation of the vacuum acting on the capsule.

5. A regulatable valve supplementary to the valve controlling the admission of auxiliary air is arranged on the secondary air supply pipe, this valve being operated so as to introduce a pressure drop which is larger as the vacuum obtaining in the admission pipe is higher.

This adjustable valve could be connected mechanically to the main valve of the carburettor so as to be closed at the same time as latter.

It could also be controlled by the vacuum obtaining in the admission pipe by means of a diaphragm-type capsule.

It could be merged or combined with the valve controlling the admission of secondary air, the vacuum obtaining in the inlet pipe being combined with the vacuum originating from the carburettor body in order to ensure the control of the said valve.

6. The assembly comprises means permitting the regulating system to be disconnected under throttling-down or full-throttle running conditions.

It will involve, for example, a contactor connected to the position of the main valve and actuating a valve controlling the inlet of secondary air, which valve may be the electromagnetic valve itself, or even a valve controlled by the vacuum obtaining in the inlet pipe.

7. The electromagnetic valve modulating the vacuum acting on the valve controlling the inlet of secondary air is controlled by the sensor by means of a device which supplies to the electromagnetic valve an opening pulse as soon as the current provided by the sensor exceeds a predetermined value, and a closure pulse when the current provided by the sensor falls below a predetermined value which is lower than the preceding value.

8. The electromagnetic valve is controlled by an electronic circuit providing pulses, of which the recurrence frequency is constant and the variable duration is a function of the current variations provided by the probe between two predetermined limits, while beyond these limits, the electromagnetic valve is completely open or completely closed.

9. In the electronic circuit, the voltage supplied by the sensor is compared with a voltage stabilised at a possibly adjustable reference level, the variation obtained being compared with the pulses supplied by a generator of saw-tooth pulses of fixed amplitude and frequency, the pulses resulting therefrom, after suitable amplification, being used for controlling the electromagnetic valve for modulating the vacuum acting on the valve controlling the auxiliary air inlet.

10. the auxiliary air inlet is divided, downstream of the valve, into as many individual branches as there are cylinders, each opening close to the inlet valve of the corresponding cylinder.

11. The above individual branches each comprises an individual calibrating means.

12. The invention is also concerned with a carburettor equipped with the aforementioned means, that is to say, comprising an auxiliary air inlet opening into the admission pipe downstream of the member determining the proportions of the air-petrol mixture, at least one valve controlling the auxiliary air inlet, this valve being controlled by the vacuum obtaining in the body of the proportioning device by means of a capsule, of which the diaphragm, supported by a resilient return means, is subjected to the vacuum by means of a pipe opening into the body, the vacuum being itself modulated by an electromagnetic valve, of which the opening is controlled by a sensor disposed in the exhaust pipe and capable of delivering an electric current which is variable as a function of the composition of the burnt gages.

13. Such a carburettor will advantageously comprise all or some of the arrangements according to 1 to 11 as set out above.

BRIEF DESCRIPTION OF THE DRAWINGS

The invention is illustrated in the accompanying drawing, in which.

DETAILED DESCRIPTION OF THE PREFERRED EMBODIMENT

Figure 1:
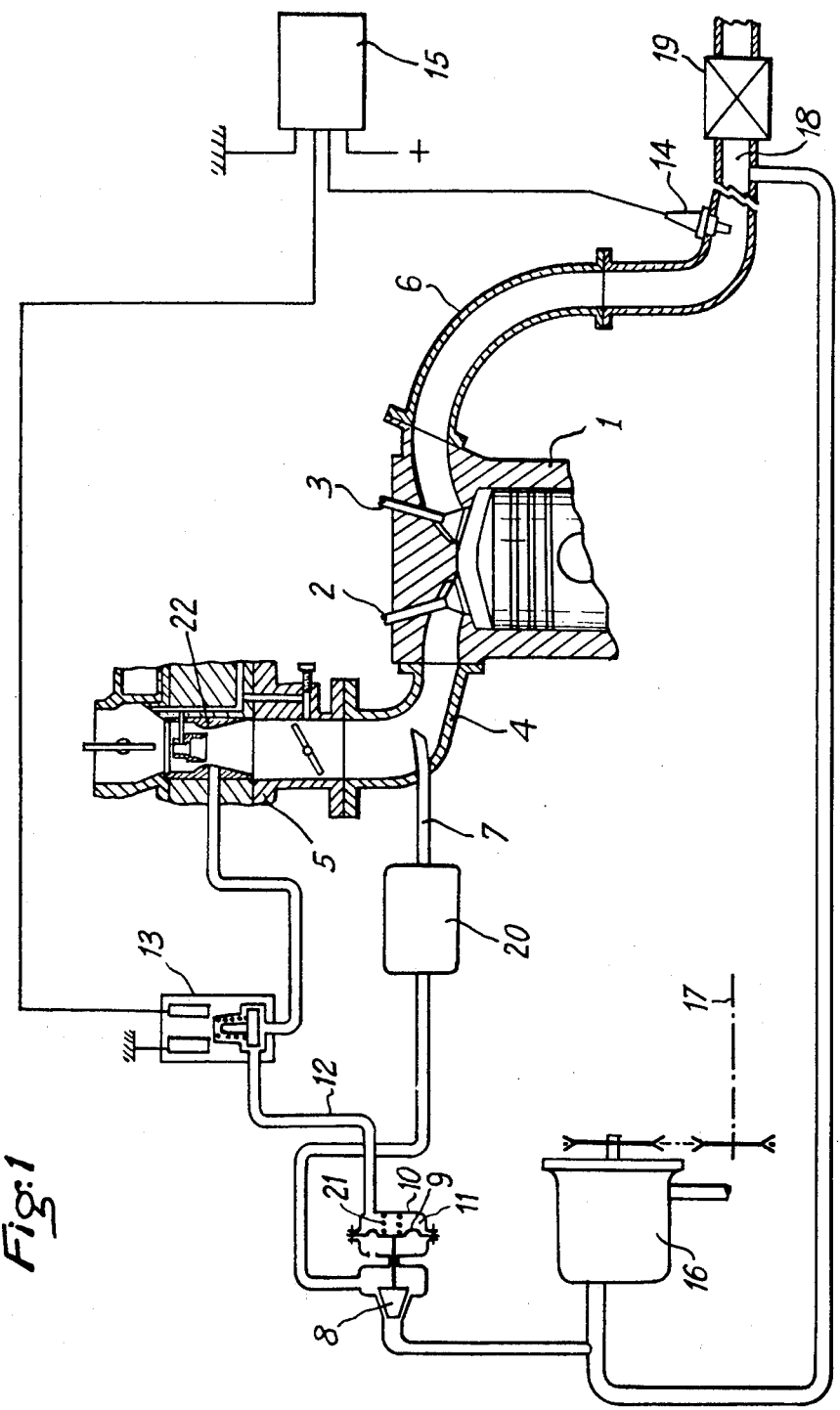
FIG. 1 is a diagrammatic view of one embodiment of the invention.

Referring to FIG. 1, one of the cylinders of the engine is represented at 1, with its inlet valve 2 and its exhaust valve 3. The valve 2 is supplied an air-petrol mixture from the carburettor 5 or other proportioning device (injection device) through an inlet or intake pipe 4 of the engine. The exhaust gases from cylinder 1 pass through the exhaust pipe 6 to reach the silencer.

According to the invention, an auxiliary air inlet 7 is connected to inlet pipe 4 downstream of carburettor 5 (when an injection device is used, the said pipe will be connected downstream of the flow meter which determines the air-petrol proportion).

This auxiliary air inlet 7 is controlled by a valve 8, the travel of valve 8 in turn being controlled by the vacuum obtaining in the proportioning device 5. Preferably, valve 8 is connected to a diaphragm 9 of a casing or capsule 10, a chamber 11 formed therein is subject to the vacuum of a venturi or choke tube 22 of carburettor 5 by way of a pipe 12, the other chamber being under atmospheric pressure and isolated from the valve 8. The diaphragm 9 is returned elastically, for example, by a spring 21. Pipe 12 is itself controlled by an electromagnetic valve 13, of which the travel of stroke is controlled by a sensor 14 located in a exhaust pipe 6, by means of a threshold detector 15. The sensor 14 will for example be a zirconium oxide-based capsule, of which one face is in contact with the burnt gases, while the other face is in contact with the atmosphere, said capsule delivering a variable voltage as a function of the difference in the partial oxygen pressure between the two faces of the capsule.

Such a sensor detects the disappearance of the oxygen in the burnt gases, this disappearance corresponding to the stoichiometric nature of the air-petrol mixture introduced into the engine. The voltage supplied by the sensor varies suddenly from a few millivolts to approximately 1000 millivolts, in order then to remain approximately stationary, while the CO content of the burnt gases increases.

The manner in which the invention operates is as follows. The threshold detector 15 is regulated for sending to electromagnetic valve 13 an opening pulse as soon as the voltage supplied by sensor 14 exceeds a chosen threshold, corresponding to a practically zero oxygen content in the burnt gases, and a closing pulse when this voltage falls below a chosen value lower than the aforementioned value. In other words, the two threshold values are situated in that part of the response curve of sensor 14 in which the voltage varies strongly for a small variation in the oxygen content, the opening voltage being equal to or higher than that of the closing voltage.

For example, the opening voltage will be 800 millivolts and the closing voltage will be 100 millivolts.

Consequently, if the proportioning device 5 delivers to the engine a mixture of which the richness causes a CO content in the exhaust gases corresponding to a zero oxygen content, the electromagnetic valve 13 is opened, the valve 8 is lifted from its seat under the effect of the vacuum obtaining in proportioning device 5 and an additional air quantity is drawn into the inlet pipe 4 through auxiliary air inlet 7.

This additional air weakens the mixture and, by means of a suitable regulation, causes the drop in the voltage supplied by the sensor 14 and the closing of the electromagnetic valve 13. This closure causes the valve 8 to fall back again onto its seat and close the additional air inlet, and consequently enrich the mixture which, in its turn, causes a fresh opening of the electromagnetic valve 13, etc.

Since the vacuum obtaining at the neck of the choke tube 22 of the carburettor 5 is proportional to the air flow passing through the carburettor, the lifting of the valve 8 is a function of this vacuum and the result thereof is that the additional air supply provided by auxiliary air inlet 7 is a function of the rate of flow of air entering the carburettor.

This function can be determined and adjusted in various ways:

In particular, regulating means for the spring 21, or other elastic return means of the valve 8, makes it possible to regulate the moment when the valve 8 is lifted, from its seat and thus the flow of additional air for a given vacuum in the choke tube 22 of the carburettor 5.

On the other hand, the design of the valve 8 and of its seat makes it possible to select any variation curve in the rate of flow of additional air as a function of the travel of the valve 8.

In particular, it thus becomes possible to obtain a zero additional air flow for idle running, because the vacuum in the carburettor is very small, and this avoids possible irregularities in the operation under these conditions.

It is also possible to obtain a small additional air flow relative to the main flow entering the carburettor when the engine is functioning under full load or at the time of acceleration. It is sufficient to provide for the maximum opening of the valve 8 to correspond to normal running, or to a given vacuum in the carburettor choke tube 22. Any increase in the running conditions or in the vacuum in the carburettor will remain without any effect on the supply of additional air. The mixture will thus be found to be automatically enriched under these running conditions.

For correct functioning of the device, it will thus be advantageous to provide an initially rich setting of the carburettor 5. Thus, in the absence of additional air, the mixture will be relatively rich (idle running, 2 to 4% of CO), and the mixture will undergo an optimal correction for a whole range of normal running conditions, so as to become insufficiently corrected under full loads and under acceleration of the engine.

The additional air could be supplied under pressure by the air pump 16 driven by the engine at 17, and this air pump could be a post-combustion air source by being connected into the exhaust pipe at 18, downstream of the sensor 14 and possibly upstream of a post-combustion catalyst 19, of which the efficiency and the life will be increased by the presence of the device according to the invention.

The injection of the additional air under pressure, by means of the pump 16, permits a much more accurate adjustment of the rates of flow of additional air, with smaller conduit systems.

On the other hand, this device eliminates the variations in the rate of flow of additional air due to the variations in the vacuum in the inlet pipe and to the pressure drops in the additional air pipe. By acting on the curve of the pressures provided by the pump as a function of the engine speed, it also makes it possible suitably to determine the inlet of additional air at the different speeds. The absolute pressure of the additional air supplied by the pump will preferably be of the order of 1 to 1.5 bars.

The delivery of additional air will be in the form of a pulsating delivery, because of the successive openings of the electromagnetic valve 13, which falls back on to its seat as soon as the effect of an air injection causes the termination of the opening signal supplied by the detector 15.

In order to attenuate these pulsations, an absorption volume or chamber 20 is advantageously provided in auxiliary air inlet 7.

In the case of engines with a laminated charge, that is to say, in which each cylinder is fed with two air-petrol mixtures by means of two inlet pipes, one of these mixtures being rich and the other poor, the additional air will preferably be sent into the pipe admitting the poor air.

In the modified form which is shown in FIGS. 2 to 6 and which represents a preferred embodiment, the vacuum obtaining in the carburettor housing 5 is transmitted to the valve 8 (controlling the auxiliary air inlet 7) by means of the capsule 10 having a diaphragm 9 and it is modulated by the electromagnetic valve 13, fitted on an escape pipe 20, which is connected to a buffer chamber 21 interposed on the pipe 12 between the carburettor 5 and the capsule or casing 10.

The sensor 14 controls the opening and the closing of the electromagnetic valve 13 via electrical or electronic means 15 and opens or closes the escape pipe 20 according to the data obtained by the sensor 14, this causing the closing or opening of the valve 8. The effect of this indirect action, with interposition of the buffer chamber 21, makes the controlling of the valve 8 much more flexible.

This flexibility is further increased by the calibration means 22 and/or 23 which are arranged on the pipe 12 upstream of the buffer chamber 21 and on the escape pipe 20, respectively.

The dimensions of the buffer chamber 21 and of the calibration means 22 and 23 are established experimentally for each type of vehicle.

The opening of the escape pipe 20 to the open air and also the intake of auxiliary air 7a, especially when a pump 16 is not used, will preferably be effected via a filter, for example, in the inlet pipe downstream of the carburettor, and upstream of the carburettor.

Figure 3:
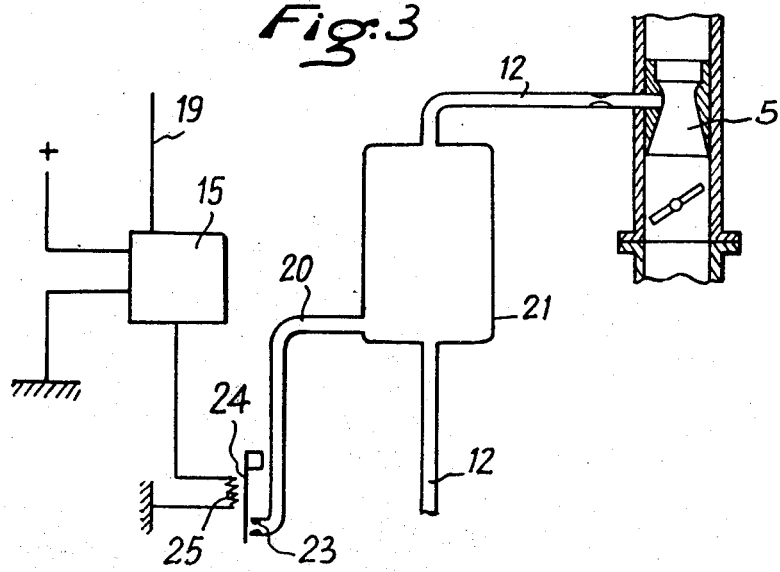
FIG. 3 is a modification in detail concerning the electromagnetic valve controlled by the sensor.

In the modified form of FIG. 3, the electromagnetic valve 13 is in the form of a thermostatic bimetallic strip 24 or the equivalent, controlling the end opening of the pipe 20 and subjected to the action of the heating resistance 25 which is supplied from the sensor 8 via the electric or electronic relays 15. The other elements are in accordance with FIG. 1.

As the displacements of the thermostatic element 24 are less sudden than those of an electromagnetic valve, this arrangement also imparts a flexibility in operation to the system.

Figure 2:
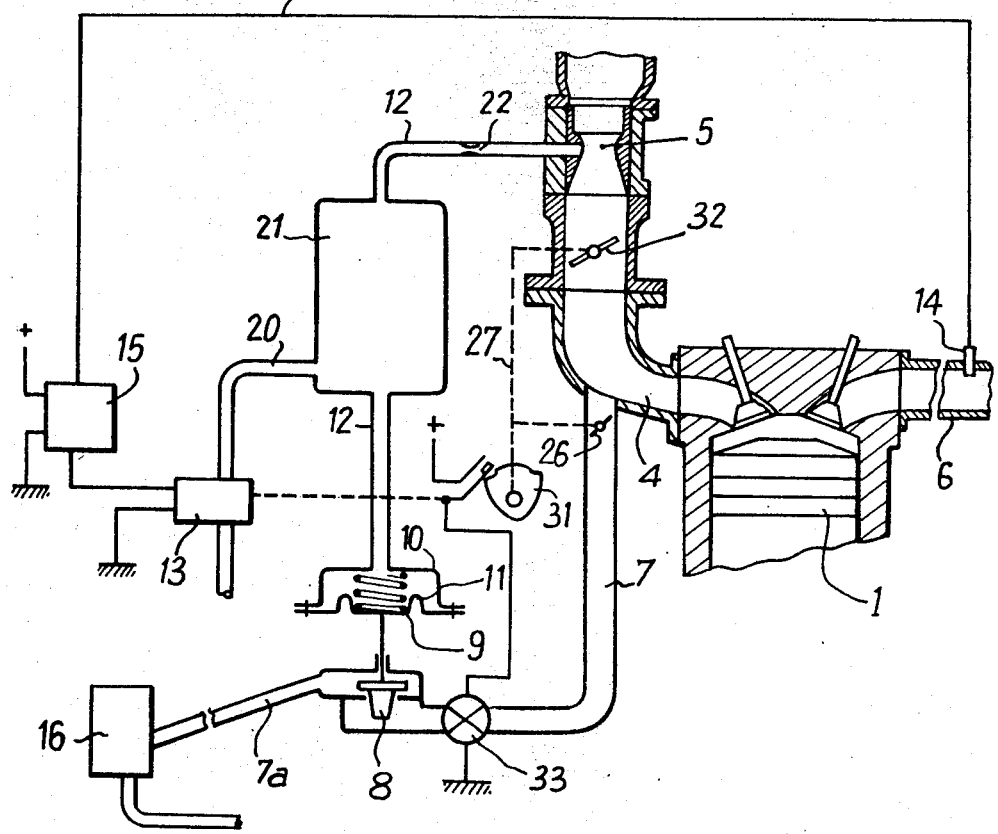
FIG. 2 is a diagrammatic view of a preferred modification of the arrangement.

As shown in FIG. 2, the auxiliary air inlet 7 also has arranged thereon a valve 26 arranged so as to introduce a pressure drop poroportional to the vacuum which is obtaining in the inlet pipe 4.

In the example shown in FIG. 2, the valve 26 is connected mechanically at 27 to the main throttle or butterfly valve 32 and is closed with the latter.

This arrangement introduces a parameter which makes it possible to differentiate between the low-load and high-speed running conditions and the high-load and low-speed running conditions, although the vacuum obtaining in the carburettor 5 may be the same.

In the case where an air pump 16 is provided, the pressure delivered by the pump is a function of the engine speed and the vacuum obtaining in the inlet pipe 4 also increases with the speed, so that the driving pressure for introduction of secondary air is of the form:

P (driving) = $P_1$ (pump) + $P_2$ (pipe vacuum), the pressures $P_1$ and $P_2$ both being a function of the engine speed.

In the case where no pump 16 is provided, the driving pressure is of the form:

P (driving) = $P_0$ (atm.) + $P_2$ (pipe vacuum), the pressure $P_2$ only being a function of the speed.

By providing the valve 26 in such a way as to introduce a pressure drop which is a function of the vacuum in the inlet pipe 4, it is thus possible to correct the driving pressure according to the speed of the motor and as a consequence to vary the regulation in accordance with the invention as a function of this speed.

Figure 4:
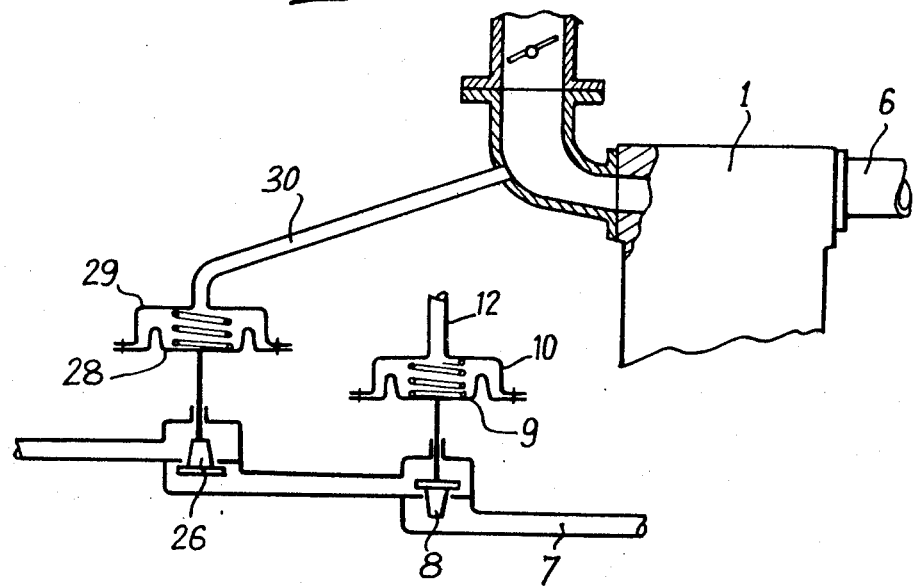
FIGS. 4 and 5 are modifications in detail concerning the controlling of the admission of secondary air.

In the modified form shown in FIG. 4, the valve 26 is arranged upstream of the valve 8 and it is controlled by the diaphragm 28 of the chamber 29, which is subject to the vacuum obtaining in the pipe 4 via the pipe 30.

Figure 5:
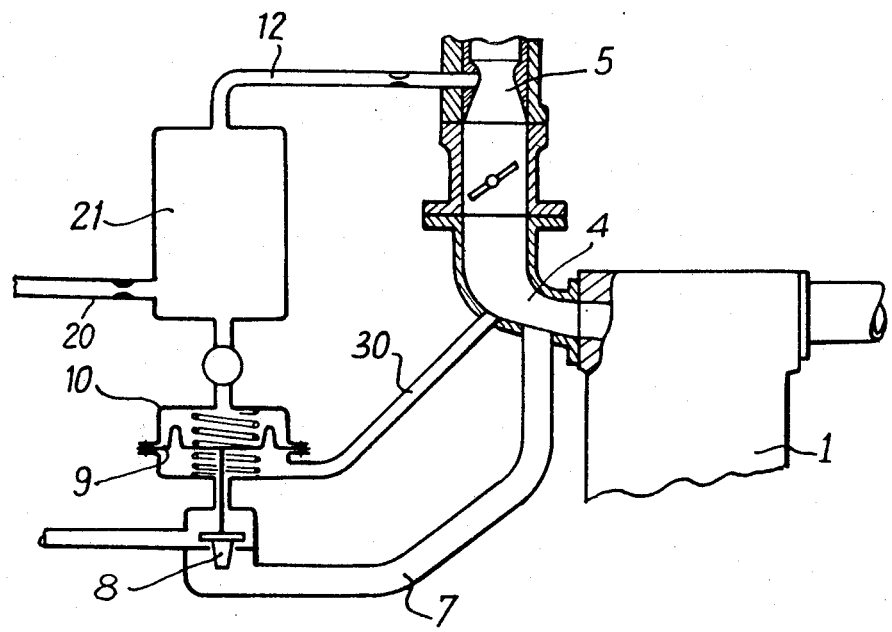

In the modification shown in FIG. 5, the valve 26 is combined with the valve 8, this latter being controlled by the diaphragm 9, which is exposed not only to the vacuum obtaining in the carburettor casing 5, modulated according to the invention, but also to the vacuum obtaining in the inlet pipe 4 via the pipe 30.

So as to avoid the regulating arrangement of the invention introducing defects in the running conditions resulting from an excessive weakening of the mixture on throttling down or with the throttle fully open, provision is also made for adding a means for interrupting the supply of secondary air under these running conditions.

The said means will for example be a cam 31 (FIG. 2) connected to the main butterfly valve 32 and acting on a contactor which controls a valve 33 included in the pipe 7, or which acts directly on the electromagnetic valve 13 for holding it in the open position, this connection being shown in broken lines in FIG. 2.

Any other equivalent means may be adopted, either starting from the extreme positions of the butterfly valve 28 or from the extreme vacuum levels obtaining in the inlet pipe under throttling down and full throttle running conditions.

Figure 6:
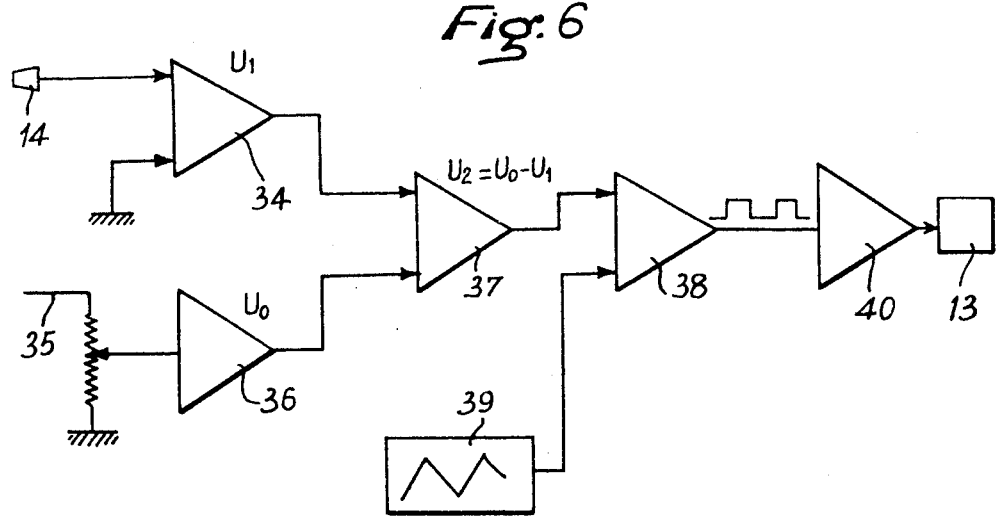
FIG. 6 is an electronic diagram concerned with the control of the electromagnetic valve.

The controlling of the electromagnetic valve 13 by means of the sensor 14 will be carried out in any appropriate manner, for example, in accordance with the diagram of FIG. 6.

In this diagram, the electromotive force of the sensor 14, after filtering at 34, is compared with an adjustable stabilised voltage provided at 35 and 36 by any suitable means and constitutes a reference voltage defining the oxygen concentration which it is desired to obtain in the exhaust gases. This comparison is effected by a comparator and spacing amplifier 37, which supplies a voltage equal or proportional to the difference between the sensor voltage and the stabilised voltage.

The gain of the amplifier 37 is adjustable and this makes it possible to regulate the voltage band in which the spacings as thus measured are situated.

The instantaneous valves of the voltages suppled at 37 are compared at 38 with those supplied by the saw-tooth signal generator 39.

At the outlet of the comparator 38, there are thus obtained:
- either a permanent positive signal, if the voltage supplied at 37 is higher than the amplitude of the saw-teeth,
- or a permanent negative signal, if this voltage is lower than or equal to the amplitude of the saw-teeth,
- or square pulses of a fixed recurrent frequency and of a duration proportional to the voltage provided at 37, if this latter is contained between the preceding limits.

An amplifier 40 delivers signals of like form to the electromagnetic valve 13, but having a power adapted to the electromagnetic valve 13.

Figure 7:
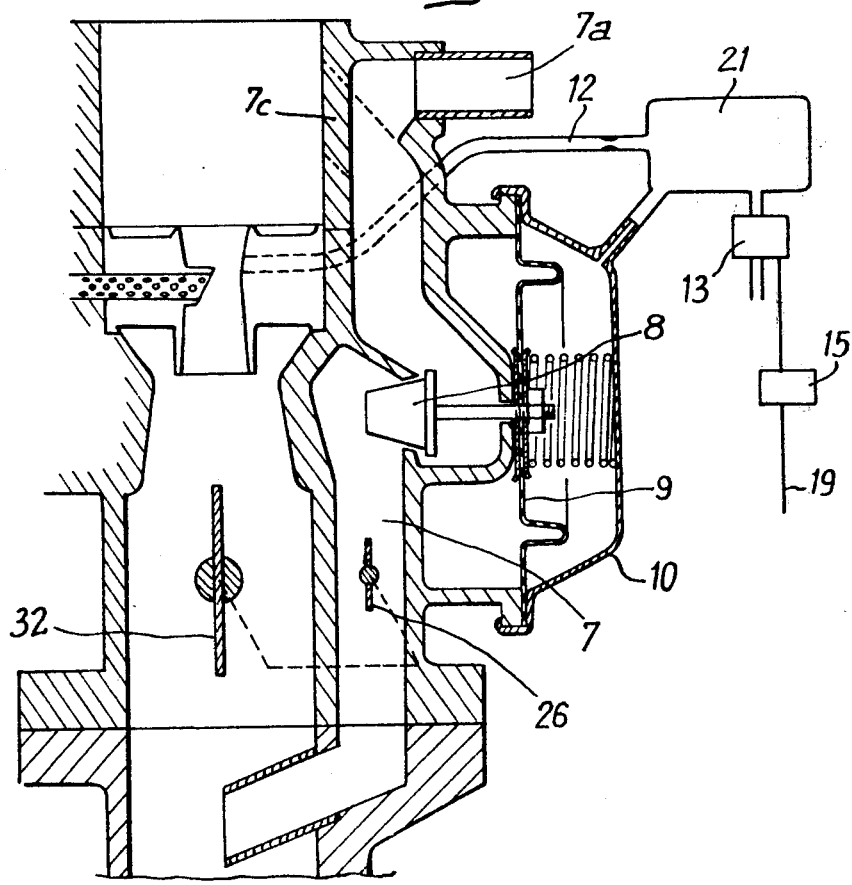
FIG. 7 shows a carburettor fitted with the devices of the invention.

FIG. 7 shows a carburettor provided with the means according to the invention. The reference numberals represent the same elements as in FIG. 1.

Such a carburettor will be connected to the buffer chamber 21 for the electromagnetic valve 13 connected at 19 to the sensor, as shown in FIG. 1.

Represented at 7a is the primary air inlet, which will be connected to a pump (not shown). As a modification, the reference 7c represents a primary air intake upstream of the carburettor and downstream of the filter, in the case where no pump is provided.

In this case, the arrangement according to the invention can be analysed in a by-pass of the carburettor by the conduit 7, controlled by the valve 8 in accordance with the means according to the invention.

Figure 8:
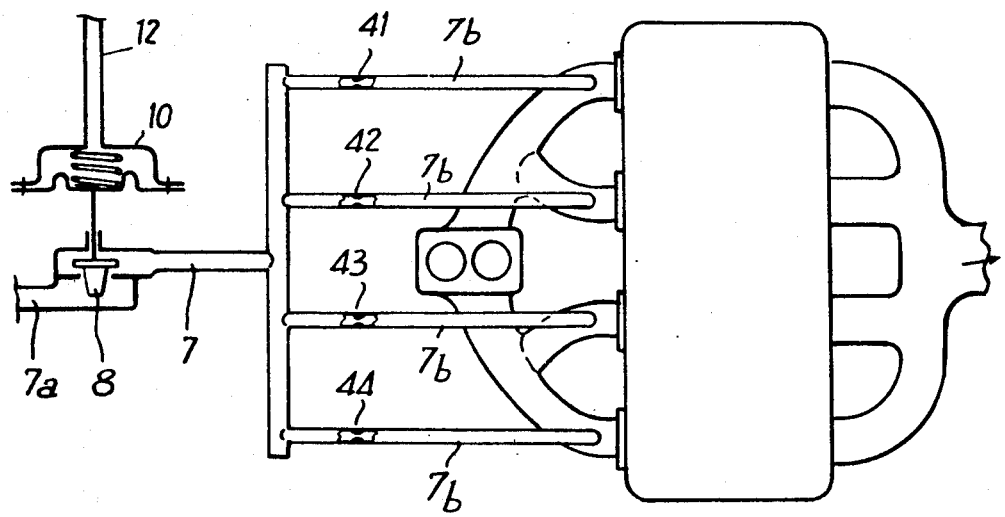
FIG. 8 represents a modification in the supply of auxiliary air to the cylinders.

FIG. 8 illustrates diagrammatically the distribution of the auxiliary air to each cylinder.

In this case, the conduit or pipe 7 is divided into several branches 7b, which each comprise calibration means 41, 42, 43, 44, this making it possible differently to calibrate the different additions of auxiliary air and as a result to correct possible defects in distribution introduced by the carburettor and the inlet pipe.

This also permits the introduction of auxiliary air as close to the inlet valves as possible, this avoiding all interference from cylinder to cylinder.

The means forming the subject of the invention results in a substantial economy in fuel and, as a result, it represents an economiser and can be used or adapted to an engine for this purpose.

We claim:

1. An arrangement for correcting the proportion of the air and fuel mixture furnished to an internal combustion engine having an intake pipe for receiving the air and fuel mixture and an exhaust pipe for burnt gases, said arrangement comprising a device for determining the proportion of the air and fuel mixture, said device being connected to said intake pipe and including a venturi, at least one auxiliary air inlet communicating with the intake pipe downstream of said proportioning device, means for providing air to said auxiliary air inlet or inlets, at least one valve controlling said auxiliary air inlet or inlets in response to the vacuum pressure obtained at said venturi of said proportioning device, chamber means operatively connected to said venturi for receiving the vacuum pressure, said chamber means including a diaphragm connected to said controlling valve and subjected to the vacuum pressure, and resilient return means for biasing said diaphragm, a sensor disposed in the exhaust pipe of the engine for delivering an electric current which is variable as a function of the composition of the burnt gases, and an electromagnetic valve for modulating the vacuum pressure received by said chamber means, said electromagnetic valve being regulated in response to the electric current delivered by said sensor.

2. An arrangement according to claim 1, further including regulating circuit means for receiving the electric current from said sensor and for delivering to said electromagnetic valve an opening pulse as soon as the electric current supplied to said circuit means by said sensor exceeds a first predetermined value and a closing pulse as soon as the electric current provided to said circuit means by said sensor falls below a second predetermined value which is lower than or equal ot the first predetermined value.

3. An arrangement according to claim 2, wherein said circuit means delivers regulating pulses to said electromagnetic valve, of which the recurrence frequency is constant and the duration is variable as a function of the variations in the electric current supplied by said sensor between two predetermined limits, whereas beyond these limits, said electromagnetic valve is completely open or completely closed.

4. An arrangement according to claim 3, wherein said circuit means includes a generator for supplying saw-tooth pulses of fixed amplitude and frequency, and means for comparing the pulses supplied by said generator and the variation between the voltage supplied by said sensor and a stabilized voltage set at an adjustable reference level, the pulses resulting therefrom, after suitable amplification, being used for regulating said electromagnetic valve.

5. An arrangement according to claim 1, further including a pipe connecting said venturi to said chamber means, a buffer chamber located on said connecting pipe, a vacuum pressure escape pipe connected to said buffer chamber and open to the atmosphere, and wherein said electromagnetic valve is positioned on said escape pipe for regulating the opening and closing of said escape pipe to the atmosphere in response to the electric current delivered by said sensor for modulating the vacuum pressure received by said chamber means.

6. An arrangement according to claim 5, further including calibrated orifices positioned in said connecting pipe between said venturi and said buffer chamber, and in said escape pipe between said buffer chamber and said electromagnetic valve for establishing pressure drops for further affecting the modulating action of said electromagnetic valve on the vacuum pressure.

7. An arrangement according to claim 1, including an adjustable valve arranged on said auxiliary air inlet for introducing a pressure drop in proportion to the vacuum pressure in the intake pipe of the engine.

8. An arrangement according to claim 7, wherein said proportioning device includes a main throttle valve and wherein said adjustable valve is mechanically connected to said main throttle valve, said adjustable valve being closed at the same time as said main throttle valve.

9. An arrangement according to claim 1, further including means for interrupting the supply of auxiliary air into the intake pipe of the engine during a throttling-down or full-throttle operation of said proportioning device.

10. An arrangement according to claim 9, wherein said interrupting means comprises a valve for regulating said auxiliary air inlet and contactor means operatively connected to said main throttle valve for actuating said regulating valve in response to the throttling-down or full-throttle position of said main throttle valve.

11. An arrangement according to claim 1, wherein said means for providing air to said auxiliary air inlet or inlets includes means for providing the air under pressure.

12. A carburetor comprising:
 a. a member for determining the proportioning of the air and fuel mixture furnished to an internal combustion engine, said member being connected to an intake pipe of the engine and having a venturi;
 b. an auxiliary air inlet communicating with the intake pipe of the engine downstream of said proportioning member;
 c. at least one valve controlling said auxiliary air inlet in response to the vacuum pressure obtained at said venturi of said proportioning member;
 d. chamber means operatively connected to said venturi for receiving the vacuum pressure therefrom, said chamber means including a diaphragm connected to said control valve and subjected to the vacuum pressure, and a resilient return means for supporting said diaphragm;
 e. a sensor disposed in an exhaust pipe of the engine for delivering an electric current which is variable as a function of the composition of the burnt gases; and
 f. an electromagnetic valve for modulating the vacuum pressure received by said chamber means, said electromagnetic valve being regulated in response to the electric current delivered by said sensor.

13. An arrangement for correcting the proportion of the air and fuel mixture furnished to an internal combustion engine having an intake pipe for receiving the air and fuel mixture and an exhaust pipe for burnt gases, said arrangement comprising a device for determining the proportion of the air and fuel mixture, said device being connected to said intake pipe and including a venturi, at least one auxiliary air inlet communicating with the intake pipe downstream of said proportioning device, means for providing air to said auxiliary air inlet or inlets, at least one valve controlling said auxiliary air inlet or inlets in response to the vacuum pressure obtained at said venturi of said proportioning device, pressure-sensitive means for actuating said at least one valve, conduit means for conducting the vacuum pressure developed at said venturi to said pressure-sensitive means, and means for modulating the vacuum pressure in said conduit means, said modulating means being responsive to the composition of the burnt gases in the exhaust pipe.

14. An arrangement according to claim 13, wherein said pressure-sensitive means comprises a diaphragm connected to said controlling valve and subjected to the vacuum pressure in said conduit means, and resilient means for biasing said diaphragm.

15. An arrangment according to claim 13, wherein said modulating means comprises a sensor disposed in the exhaust pipe of the engine for delivering an electric current which is variable as a function of the composition of the burnt gases, and an electromagnetic valve for modulating the vacuum pressure received by said conduit means, said electromagnetic valve being regulated in response to the electric current delivered by said sensor.

16. An arrangement according to claim 13, further including a buffer chamber located on said conduit means, a vacuum pressure escape pipe connected to said buffer chamber and open to the atmosphere, and wherein said modulating means includes a sensor disposed in the exhaust pipe of the engine for delivering an electric current which is variable as a function of the composition of the burnt gases and a thermostatic valve arranged on said escape pipe and actuated by the heating produced by the electric current originating from said sensor for obtaining a direct progressive modulation of the vacuum pressure received by said pressure-sensitive means.

17. An arrangement according to claim 13, further including an adjustable valve arranged on said auxiliary air inlet for introducing a pressure drop in proportion to the vacuum pressure in the intake pipe of the engine, and diaphragm-type capsule means responsive to the vacuum in the intake pipe of the engine for controlling said adjustable valve.

18. An arrangement according to claim 17, wherein said adjustable valve is operatively connected to said at least one valve controlling said auxiliary air inlet for controlling said at least one valve in response to the combined vacuum pressure obtained at said venturi of the proportioning device and the vacuum in the intake pipe of the engine.

19. A carburetor comprising:
 a. a member for determining the proportion of the air and fuel mixture furnished to an internal combustion engine having an intake pipe for receiving the air and fuel mixture and an exhaust pipe for burnt gases, said member being connected to said intake pipe and including a venturi;
 b. at least one auxiliary air inlet communicating with the intake pipe downstream of said proportioning member;

c. means for providing air to said auxiliary air inlet or inlets;

d. at least one valve controlling said auxiliary air inlet or inlets in response to the vacuum pressure obtained at said venturi of said proportioning member;

e. pressure-sensitive means for actuating said at least one valve;

f. conduit means for conducting the vacuum pressure developed at said venturi to said pressure-sensitive means; and g. means for modulating the vacuum pressure in said conduit means, said modulating means being responsive to the composition of the burnt gases in the exhaust pipe.

20. The carburetor according to claim 19, wherein said pressure-sensitive means comprises a diaphragm connected to said controlling valve and subjected to the vacuum pressure in said conduit means, and resilient means for biasing said diaphragm.

21. The carburetor according to claim 20, wherein said modulating means comprises a sensor disposed in the exhaust pipe of the engine for delivering an electric current which is variable as a function of the composition of the burnt gases, and an electromagnetic valve for modulating the vacuum pressure received by said conduit means, said electromagnetic valve being regulated in response to the electric current delivered by said sensor.

* * * * *

UNITED STATES PATENT OFFICE
CERTIFICATE OF CORRECTION

Patent No. 3,977,375          Dated August 31, 1976

Inventor(s) Bernard R. Laprade et al

It is certified that error appears in the above-identified patent and that said Letters Patent are hereby corrected as shown below:

IN FOREIGN APPLICATION PRIORITY DATA:

The priority date for French Application No. 73 23453 should be changed from "June 26, 1973" to --June 27, 1973--.

Signed and Sealed this

Twenty-third Day of November 1976

[SEAL]

Attest:

RUTH C. MASON
Attesting Officer

C. MARSHALL DANN
Commissioner of Patents and Trademarks